United States Patent
Liu et al.

(10) Patent No.: US 9,612,758 B1
(45) Date of Patent: Apr. 4, 2017

(54) PERFORMING A PRE-WARM-UP PROCEDURE VIA INTELLIGENTLY FORECASTING AS TO WHEN A HOST COMPUTER WILL ACCESS CERTAIN HOST DATA

(71) Applicant: EMC Corporation, Hopkinton, MA (US)

(72) Inventors: Xiaoqin Liu, Chengdu (CN); Lei Chen, Shanghai (CN); Yangbo Jiang, Chengdu (CN); Christine Buckley, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 14/643,206

(22) Filed: Mar. 10, 2015

(51) Int. Cl.
*G06F 12/00* (2006.01)
*G06F 3/06* (2006.01)
*G06F 12/0862* (2016.01)

(52) U.S. Cl.
CPC .......... *G06F 3/0619* (2013.01); *G06F 3/0665* (2013.01); *G06F 3/0688* (2013.01); *G06F 3/0689* (2013.01); *G06F 12/0862* (2013.01); *G06F 2212/602* (2013.01)

(58) Field of Classification Search
CPC .... G06F 3/0619; G06F 3/0689; G06F 3/0665; G06F 3/0688; G06F 2212/602; G06F 12/0862
See application file for complete search history.

(56) References Cited

U.S. PATENT DOCUMENTS

| | | | |
|---|---|---|---|
| 6,067,565 A * | 5/2000 | Horvitz | G06F 17/30861 707/E17.107 |
| 6,138,126 A * | 10/2000 | Hitz | G06F 3/0613 |
| 7,822,731 B1 | 10/2010 | Yu et al. | |
| 8,239,584 B1 | 8/2012 | Rabe et al. | |
| 8,381,213 B1 | 2/2013 | Naamad et al. | |
| 8,429,351 B1 | 4/2013 | Yu et al. | |
| 8,627,015 B2 | 1/2014 | Durocher et al. | |
| 8,667,224 B1 | 3/2014 | Yu et al. | |
| 8,898,357 B1 | 11/2014 | Burke | |
| 8,935,493 B1 | 1/2015 | Dolan et al. | |
| 8,959,249 B1 | 2/2015 | Love | |
| 8,972,672 B1 | 3/2015 | Wallace et al. | |
| 9,026,740 B1 | 5/2015 | Shilane et al. | |

(Continued)

*Primary Examiner* — Kalpit Parikh
(74) *Attorney, Agent, or Firm* — BainwoodHuang

(57) ABSTRACT

A technique operates data storage equipment. The technique involves, during a first time period and while processing circuitry performs host I/O operations on behalf of a set of hosts, performing a data identification operation which provides a data identification result identifying particular data which is routinely accessed by the processing circuitry. The technique further involves, during a second time period after the first time period and in response to the data identification result, copying the particular data from secondary storage to an extension cache which forms part of primary storage to pre-fetch the particular data from the secondary storage for subsequent use by the processing circuitry. The technique further involves, during a third time period after the second time period and while the processing circuitry performs further host I/O operations on behalf of the set of hosts, accessing the particular data from the extension cache.

16 Claims, 5 Drawing Sheets

(56) References Cited

U.S. PATENT DOCUMENTS

| | | |
|---|---|---|
| 9,110,792 B1 | 8/2015 | Douglis et al. |
| 9,116,902 B1 | 8/2015 | Shilane et al. |
| 9,141,301 B1 | 9/2015 | Wallace et al. |
| 9,158,540 B1 | 10/2015 | Tzelnic et al. |
| 9,189,402 B1 | 11/2015 | Smaldone et al. |
| 9,189,408 B1 | 11/2015 | Douglis et al. |
| 2004/0044830 A1* | 3/2004 | Gibble ................. G06F 3/0613 711/4 |
| 2005/0060498 A1* | 3/2005 | Curtis ................. G06F 12/0862 711/134 |
| 2007/0073964 A1* | 3/2007 | Dawson ................. G06F 3/061 711/111 |
| 2013/0346672 A1* | 12/2013 | Sengupta ............ G06F 12/0871 711/103 |

\* cited by examiner

PERFORMING A PRE-WARM-UP PROCEDURE VIA INTELLIGENTLY FORECASTING AS TO WHEN A HOST COMPUTER WILL ACCESS CERTAIN HOST DATA

BACKGROUND

A conventional data storage system manages host data on behalf of one or more external host computers. Such a storage-dedicated system is typically provisioned for fault tolerance (e.g., host data redundancy, replication, recovery, etc.) and high capacity (e.g., terabytes, petabytes, etc.).

During operation, storage processing circuitry of the data storage system (e.g., director circuit boards, storage processors, etc.) processes host input/output (I/O) instructions such as small computer system interface (SCSI) read and write commands. For example, to process a SCSI write command from an external host computer, the storage processing circuitry caches host data from the host computer into main memory, and eventually transfers the host data from main memory to an array of disk drives. Additionally, to process a SCSI read command from the external host computer, the storage processing circuitry loads host data from the array of disk drives into main memory, as well as provides the host data to the host computer.

SUMMARY

When host data already resides in main memory (e.g., due to a recent SCSI write command from the external host computer), the amount of time required for a data storage system to satisfy a subsequent SCSI read command from the host computer may be on the order of nanoseconds (e.g., 50 to 150 nanoseconds). However, if the host data is not yet in main memory but must be loaded from an array of disk drives to satisfy the SCSI read command from the host computer, the time latency may be on the order of milliseconds (e.g., 5 to 15 milliseconds). Moreover, the amount of time required to retrieve the host data from the array of disk drives may considerably longer if the data storage system must first retrieve metadata from the array of disk drives (e.g., a table of logical block addresses, a portion of an mode table, etc.) in order to then determine the correct location of the host data on the array of disk drives.

Advantageously, improved techniques are directed to performing a pre-warm-up procedure by intelligently forecasting when a host computer will access certain host data at a routine time in the future and then, in response to such forecasting, moving certain data from secondary storage (e.g., an array of storage devices) into an extension cache (e.g., flash memory which expands primary storage) ahead of time. The data which is moved into the extension cache may be the host data itself, metadata (e.g., a table of logical block addresses, a portion of an mode table, other indexes, etc.), combinations thereof, and so on. Such operation reduces response time (e.g., data is already moved to primary storage and available) as well as stabilizes input/output (I/O) operations per second (IOPS) over the course of operation (e.g., the data is moved into primary storage during periods of lower IOPS).

One embodiment is directed to a method of operating data storage equipment. The method includes, during a first time period and while processing circuitry of the data storage equipment performs host I/O operations on behalf of a set of external host computers, performing a data identification operation which provides a data identification result identifying particular data which is routinely accessed by the processing circuitry of the data storage equipment. The method further includes, during a second time period after the first time period and in response to the data identification result, copying the particular data from secondary storage of the data storage equipment to an extension cache which forms part of primary storage of the data storage equipment to pre-fetch the particular data from the secondary storage for subsequent use by the processing circuitry. The method further includes, during a third time period after the second time period and while the processing circuitry of the data storage equipment performs further host I/O operations on behalf of the set of external host computers, accessing the particular data from the extension cache which forms part of the primary storage of the data storage equipment.

In some arrangements, performing the data identification operation includes:
  (i) measuring host I/O operation statistics while the processing circuitry performs the host I/O operations on behalf of the set of external host computers, and
  (ii) identifying the particular data based on the host I/O operation statistics which were measured while the processing circuitry performed the host I/O operations on behalf of the set of external host computers.

In some arrangements, the secondary storage of the data storage equipment includes an array of storage devices which stores multiple logical units of storage (LUNs). In these arrangements, measuring the host I/O operation statistics includes collecting respective host I/O activity metrics for the multiple LUNs over a series of days of the first time period. Additionally, identifying the particular data based on the host I/O operation statistics includes selecting a particular LUN of the multiple LUNs based on the respective host I/O activity metrics which were collected over the series of days.

In some arrangements, selecting the particular LUN includes, based on the respective host I/O activity metrics, (i) detecting a high host I/O activity trend for the particular LUN which lasts a predefined number of days of the series of days, the predefined number of days being at least two days, and (ii) outputting a particular LUN identifier which uniquely identifies the particular LUN among the multiple LUNs.

In some arrangements, detecting the high host I/O activity trend for the particular LUN which lasts the predefined number of days of the series of days includes discovering that host I/O activity for the particular LUN exceeded a predefined high host I/O activity threshold during a particular time of day on each day of the predefined number of days of the series of days.

In some arrangements, copying the particular data from the secondary storage to the extension cache includes, based on the particular LUN identifier, transferring at least a portion of the particular LUN to the extension cache during the second time period.

In some arrangements, the method further includes:
  (i) identifying a certain time of the day on each day of the predefined number of days of the series of days in which the host I/O activity for the particular LUN was less than a predefined low host I/O activity threshold, and
  (ii) setting the certain time of a particular day following the series of days as the second time period during which at least the portion of the particular LUN is transferred to the extension cache.

In some arrangements, accessing the particular data from the extension cache during the third time period includes accessing the portion of the particular LUN during the particular time of day of the particular day following the series of days.

In some arrangements, transferring at least the portion of the particular LUN to the extension cache during the second time period includes moving metadata of the particular LUN from the array of storage devices to the extension cache. In these arrangements, the metadata is different from host data which is read and written by the set of external host computers.

In some arrangements, the data storage equipment stores the host data in a block-based volume. Here, moving the metadata includes copying at least a portion of a logical block address (LBA) table for the particular LUN from the array of storage devices to the extension cache.

In some arrangements, the data storage equipment stores the host data as files of a file system. Here, moving the metadata includes copying at least a portion of an mode table of the file system from the array of storage devices to the extension cache.

In some arrangements, the secondary storage of the data storage equipment includes an array of storage devices. In these arrangements, the primary storage of the data storage equipment includes (i) volatile memory which provides a standard access time which is faster than that provided by the array of storage devices and (ii) non-volatile flash memory which forms the extension cache. Additionally, the method further includes allocating a portion of the non-volatile flash memory which forms the extension cache as a pre-fetch cache to hold pre-fetched data.

In some arrangements, allocating the portion of the non-volatile flash memory includes defining, as the pre-fetch cache, an area of non-volatile memory formed by a set of solid state disk drives. Here, the particular data is copied from the secondary storage of the data storage equipment to the area of non-volatile memory formed by the set of solid state disk drives during the second time period.

In some arrangements, allocating the portion of the non-volatile flash memory includes defining, as the pre-fetch cache, an area of non-volatile memory formed by a set of flash memory cards. Here, the particular data is copied from the secondary storage of the data storage equipment to the area of non-volatile memory formed by the set of flash memory cards during the second time period.

Another embodiment is directed to data storage equipment which includes a communications interface to communicate with a set of external host computers, memory which forms primary storage and secondary storage, and processing circuitry coupled to the communications interface and the memory. The memory stores instructions which, when carried out by the processing circuitry, cause the processing circuitry to:

(A) during a first time period and while the processing circuitry performs host I/O operations on behalf of the set of external host computers, perform a data identification operation which provides a data identification result identifying particular data which is routinely accessed by the processing circuitry, (B) during a second time period after the first time period and in response to the data identification result, copy the particular data from the secondary storage to an extension cache which forms part of the primary storage to pre-fetch the particular data from the secondary storage for subsequent use by the processing circuitry, and (C) during a third time period after the second time period and while the processing circuitry performs further host I/O operations on behalf of the set of external host computers, access the particular data from the extension cache which forms part of the primary storage.

Yet another embodiment is directed to a computer program product having a non-transitory computer readable medium which stores a set of instructions to pre-fetch data. The set of instructions, when carried out by data storage equipment, causes the data storage equipment to perform a method of:

(A) during a first time period and while processing circuitry of the data storage equipment performs host I/O operations on behalf of a set of external host computers, performing a data identification operation which provides a data identification result identifying particular data which is routinely accessed by the processing circuitry of the data storage equipment;

(B) during a second time period after the first time period and in response to the data identification result, copying the particular data from secondary storage of the data storage equipment to an extension cache which forms part of primary storage of the data storage equipment to pre-fetch the particular data from the secondary storage for subsequent use by the processing circuitry; and (C) during a third time period after the second time period and while the processing circuitry of the data storage equipment performs further host I/O operations on behalf of the set of external host computers, accessing the particular data from the extension cache which forms part of the primary storage of the data storage equipment.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing a pre-warm-up procedure using intelligent forecasting of when a host computer will access certain host data.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing a pre-warm-up procedure by intelligently forecasting when a host computer will access certain host data at a routine time in the future, and moving certain data from secondary storage (e.g., an array of storage devices) into an extension cache (e.g., flash memory which expands primary storage) ahead of time based on such intelligent forecasting. The data which is moved into the extension cache may be host data, metadata (e.g., a table of logical block addresses, a portion of an mode table, other indexes, etc.), combinations thereof, and so on. Such pre-warm-up operation reduces response time (e.g., the data is already moved to primary storage and available) as well as evens out input/output (I/O) operations per second (IOPS) over the course of operation (e.g., the data is moved into primary storage during times of lower IOPS).

Figure 1:
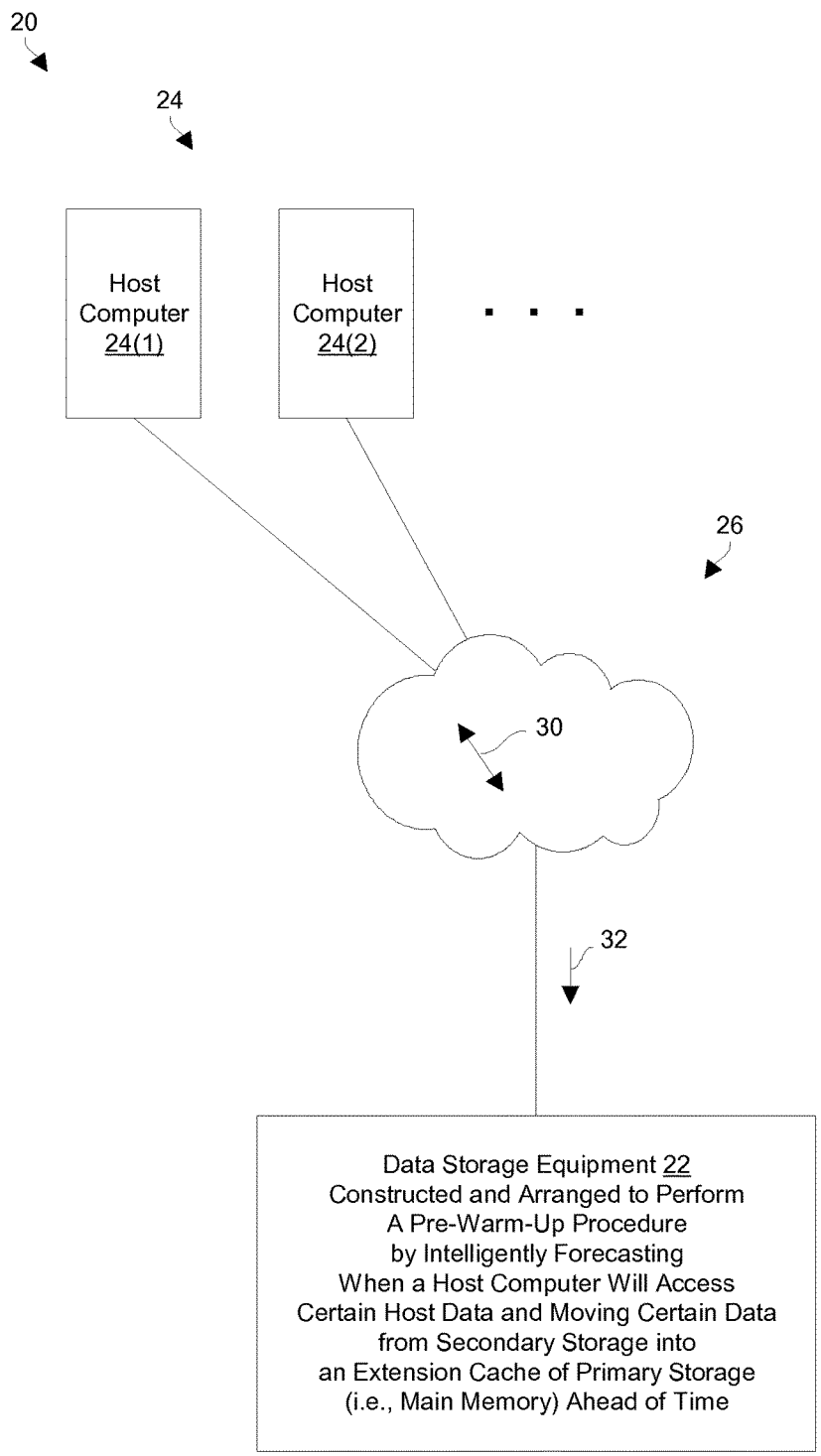
FIG. 1 is a block diagram of an electronic environment which is suitable for performing a pre-warm-up procedure by intelligent forecasting when a set of host computers will access certain host data.

FIG. 1 shows an electronic environment 20 which is suitable for performing a pre-warm-up procedure using intelligent forecasting to reduce response time and even out IOPS. The electronic environment 20 includes data storage equipment 22, external host computers 24(1), 24(2), . . . (collectively, host computers 24), and a communications medium 26. The electronic environment 20 may include other devices as well.

The data storage equipment 22 is constructed and arranged to provide access to host data on behalf of the host computers 24. In some arrangements, the data storage equipment 22 provides block-based storage by storing the host data in blocks of logical storage units (LUNs) or volumes and addressing the blocks using logical block addresses (LBAs). In other arrangements, the data storage equipment 22 provides file-based storage by storing the host data as files of a file system and locating file data using mode structures. In yet other arrangements, the data storage equipment 22 stores file systems within LUNs, and so on.

Each host computer 24 is constructed and arranged to perform useful work. Along these lines, a host computer 24 may be a client device such as a desktop computer, a tablet, a smartphone, etc. Alternatively, a host computer 24 may be a server device such as an enterprise server, a file server, an email server, a web server, a content server, an application server, and so on. Such host computers 24 may store host data in and retrieve host data from the data storage equipment 22.

The communications medium 26 is constructed and arranged to connect the various components of the electronic environment 20 together to enable these components to exchange electronic signals 30 (e.g., see the double arrow 30). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic communications devices and cabling, wireless communications devices, combinations thereof, etc. Furthermore, the communications medium 30 is capable of supporting LAN-based communications, SAN-based communications, cellular communications, combinations thereof, etc.

During operation, the data storage equipment 22 performs useful work such as performing host initiated I/O operations in response to host I/O requests 32 from the host computers 24. Concurrently, the data storage equipment 22 monitors activity to intelligently forecast which data of the data storage equipment 22 will be accessed at a routine time in the future.

For example, suppose that the data storage equipment 22 belongs to an enterprise. In this example, suppose that the data storage equipment 22 manages multiple LUNs on behalf of the host computers 24, i.e., enterprise servers. Further suppose the data storage equipment 22 determines that a particular LUN is heavily accessed routinely at 9 am each business day (e.g., by a server in the enterprise's finance department).

With this information available, the data storage equipment 22 intelligently forecasts (or predicts) that the same particular LUN will be heavily accessed at 9 am on subsequent business days. Accordingly, the data storage equipment 22 moves certain data from secondary storage into an extension cache of primary storage (i.e., main memory) of the data storage equipment 22 ahead of time (e.g., during a routine time in which the data storage equipment 22 is less busy such as at 6:30 am) to reduce latency and/or smoothen the I/O load across each subsequent business day. It will be discussed in further detail below that the extension cache is a special part of primary storage formed by augmenting the traditional volatile memory with flash memory (e.g., flash memory cards, solid state drives, etc.).

Examples of data to copy into the extension cache include host data, a logical block address table or portions thereof for the particular LUN, an mode table for a file system which is stored in the particular LUN, and so on. With such a pre-warm-up procedure, there is less peak I/O loading on the data storage equipment 22 and faster response time at 9 am on each subsequent business day.

Moreover, such intelligent forecasting and data movement can be performed continuously and adapt to changes in IOPs on different days, at different times of each day, and so on. Further details will now be provided with reference to FIG. 2.

Figure 2:
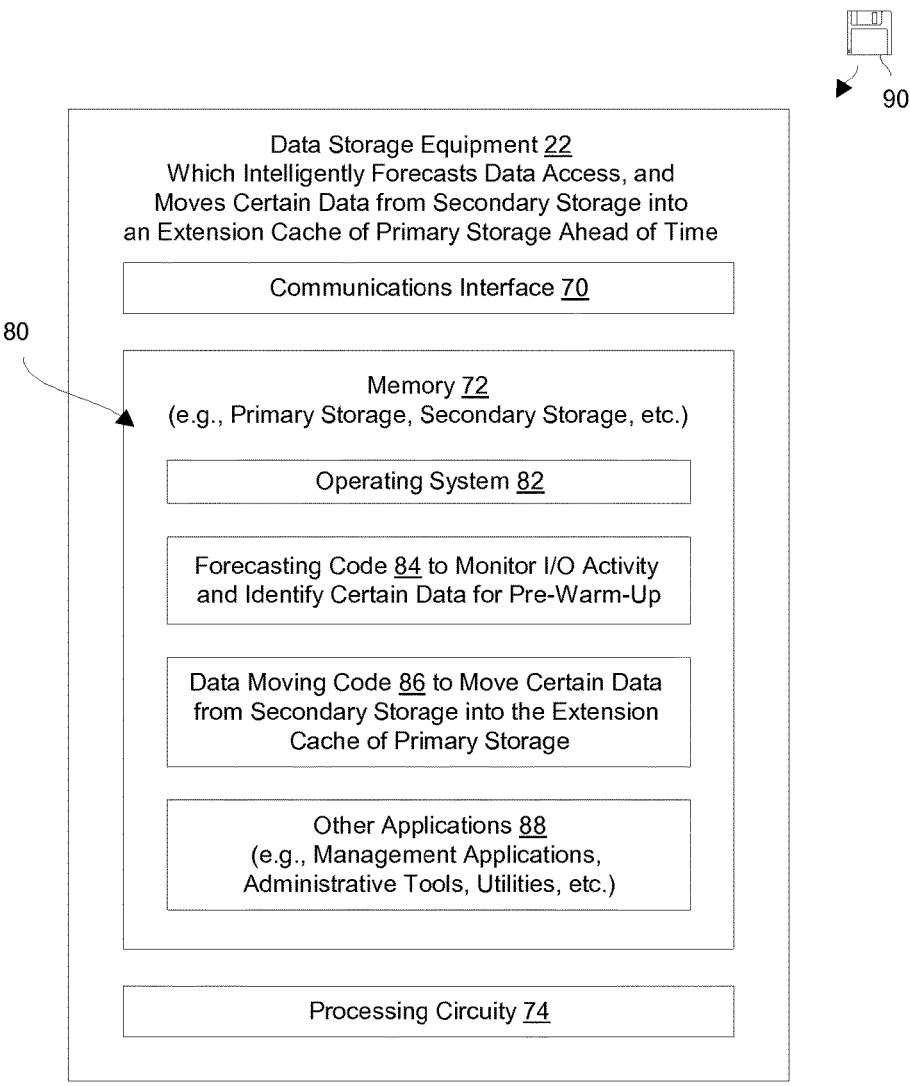
FIG. 2 is a block diagram of data storage equipment of the electronic environment of FIG. 1.

FIG. 2 shows particular details of the data storage equipment 22 of FIG. 1. The data storage equipment 22 includes a communications interface 70, memory 72, and processing circuitry 74.

The communications interface 70 is constructed and arranged to connect the data storage equipment 22 to the communications medium 26 to enable communications with other components of the electronic environment 20 (FIG. 1). Such communications may be IP-based, cellular-based, cable-based, fiber-optic based, wireless, combinations thereof, and so on. Accordingly, the communications interface 70 enables the data storage equipment 22 to robustly and reliably communicate with external devices such as the host computers 24.

The memory 72 is intended to represent both volatile storage (e.g., DRAM, SRAM, etc.) and non-volatile storage (e.g., flash memory, magnetic memory, etc.). The memory 72 stores a variety of software constructs 80 including an operating system 82 to manage resources of the data storage equipment 22, forecasting code 84 to monitor I/O activity and identify certain data for pre-warm-up, data moving code 86 to move certain data from secondary storage into the extension cache of primary storage, and other applications 88 (e.g., management applications, administrative tools, utilities, other data collection and user level applications, and so on).

The processing circuitry 74 is constructed and arranged to operate in accordance with the various software constructs 80 stored in the memory 72. Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the data storage equipment 22. In particular, the computer program product 90 has a non-transitory (or non-volatile) computer readable medium which stores a set of instructions which controls one or more operations of the data storage equipment 22. Examples of suitable computer readable storage media include tangible articles of manufacture and apparatus which store instructions in a non-volatile manner such as CD-ROM, flash memory, disk memory, tape memory, and the like.

During operation, the data storage equipment 22 performs useful work. In particular, the processing circuitry 74 executes the various software constructs 80 to form specialized storage processing circuitry which loads and stores host data on behalf of the external host computers 24 (also see FIG. 1).

Additionally, the processing circuitry 74 executes the forecasting code 84 to form specialized forecasting circuitry which monitors I/O activity over time. In particular, the specialized forecasting circuitry logs IOPS throughout the day, and over multiple days to determine whether there are any trends in operation. Based on an analysis of the logged IOPS, the specialized forecasting circuitry identifies a particular LUN which is routinely busy at the same time each day.

Furthermore, the processing circuitry 74 executes the data moving code 86 to form specialized data moving circuitry which copies certain data pertaining the particular LUN into the extension cache of primary storage ahead of time so that this pre-fetched data is available ahead of that time on the next day. Such pre-warm-up operation shifts the movement of that certain data to a time of lower IOPS activity so there is less load during the routinely busy time.

It should be understood that the forecasting code 84 and/or the data moving code 86 can be distributed among the various software constructs 80 in different ways. To this end, in some arrangements, the forecasting code 84 is a utility which is part of a data storage management application (i.e., see the other applications 88 in FIG. 2) operated by a user (e.g., an administrator of the data storage equipment 22). Additionally, in some arrangements, the data moving code 86 is a portion of the operating system 82 (e.g., within the I/O stack or I/O pathway). Other arrangements are suitable for use as well. Further details will now be provided with reference to FIG. 3.

Figure 3:
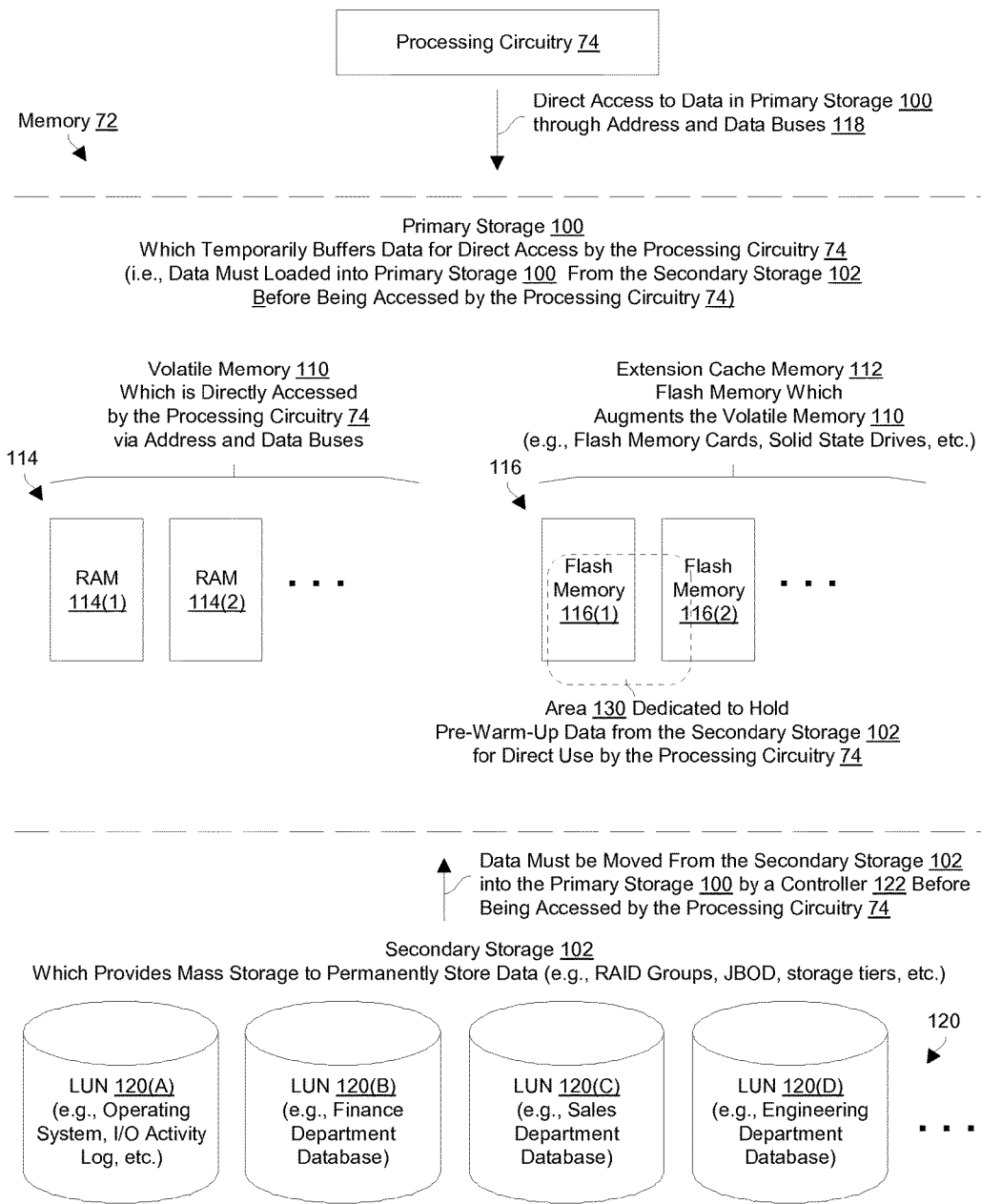
FIG. 3 is a block diagram of particular memory details of the data storage equipment of FIG. 2.

FIG. 3 shows particular details of how data is moved during pre-warm-up. As shown, the memory 72 (also see FIG. 2) includes primary storage (or main memory) 100 and secondary storage 102.

The primary storage 100 includes volatile memory 110 and extension cache memory 112. The volatile memory 110 is formed by random access memory boards (or memory modules) 114(1), 114(2), . . . (collectively, RAM 114). The extension cache memory 112 is formed by flash memory cards (or circuit boards) 116(1), 116(2), . . . (collectively, flash memory 116). The processing circuitry 74 directly accesses the primary storage 100 via address and data buses 118.

The secondary storage 102 includes mass storage devices (e.g., one or more arrays of storage devices) which permanently stores the data of the data storage equipment 22 (i.e., non-volatile storage). Such secondary storage 102 may be formed by storage devices (e.g., flash memory drives, magnetic disks, etc.) arranged in particular configurations such as (redundant array of independent disks) RAID groups, just a bunch of disks (JBOD), and so on. In some arrangements, the secondary storage 102 includes multiple tiers of storage such as a first tier of flash memory drives to store very hot data, a second tier of fast magnetic disks to store normal data, and a third tier of slow magnetic disks to store infrequently accessed data.

As shown in FIG. 3, the secondary storage 102 holds multiple LUNs 120(A), 120(B), 120(C), 120(D), . . . (collectively, LUNs 120). In order for the processing circuitry 74 to access data in the secondary storage 102, a controller 122 first moves that data from the secondary storage 102 into the primary storage 100. The processing circuitry 74 then accesses the data from the primary storage 100 as mentioned above. Such data may include metadata (e.g., a portion of an LBA table, a portion of an mode table, other indexes and configuration data, etc.), programs (e.g., operating system instructions, utilities, etc.), and host data (e.g., a finance department database, a sales department database, an engineering department database, etc.).

During operation, the processing circuitry 74 while executing the forecasting code 84 (FIG. 2) forms specialized forecasting circuitry which continuously collects and analyzes I/O activity. At some point, the specialized forecasting circuitry identifies periodic high I/O traffic for a particular LUN 120. To this end, the specialized forecasting circuitry may apply certain criteria such as identifying the particular LUN 120 only if there is a high I/O traffic trend of N days in a row (e.g., two days, three days, five business days, etc.).

When the specialized forecasting circuitry discovers the trend, the specialized forecasting circuitry then allocates an area or section 130 of the extension cache memory 112 to hold pre-warm-up data. Essentially, this pre-warm-up data is the same data that would normally be loaded from the secondary storage 102 into the primary storage 100 in response to host I/O instructions from the host computers 24 (FIG. 1). However, instead of moving the data in response to the host I/O instructions, the specialized forecasting circuitry directs the processing circuitry 74 to execute the data moving code 86 (FIG. 2) to form specialized data moving circuitry which proactively moves the data from the secondary storage 102 into the primary storage 100 ahead of time. In particular, the specialized data moving circuitry commands a controller 122 copy the data from the secondary storage 102 into the allocated extension cache area 130 of the primary storage 100. Now, the processing circuitry 74 is able to directly access the data from the primary storage 100.

It should be understood that various types of data can be moved from the secondary storage 102 into the extension cache area 130 in this pre-warm-up manner. For example, if extension cache memory space is limited, the data may simply include a portion of a LBA table or an mode structure. However, if the extension cache memory space is sizable (e.g., 1 TB or greater), the data may include other types of data such as host data. Such operation improves quality of service (QoS) and evens out I/O activity for better overall performance. Further details will now be provided with reference to an example and FIGS. 4 and 5.

Figure 4:
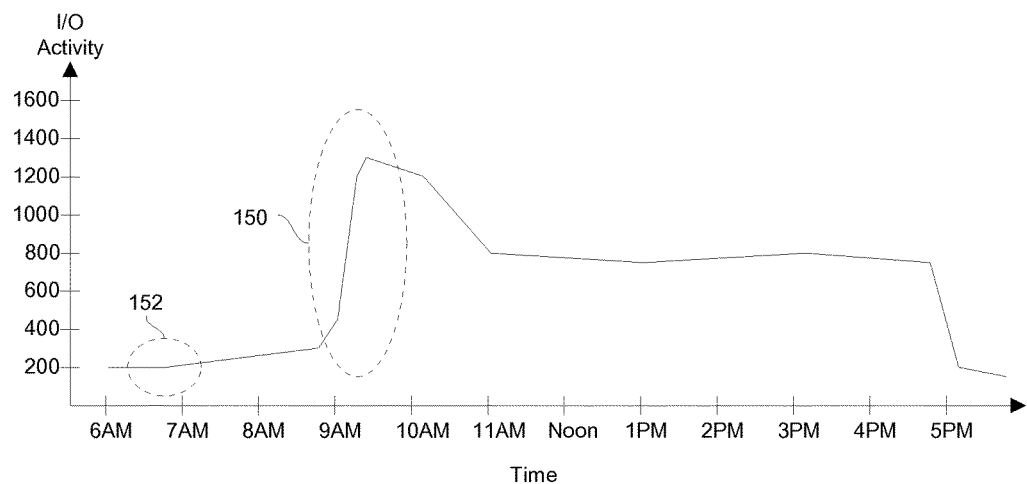
FIG. 4 shows example I/O activity for the data storage equipment prior to routinely performing a pre-warm-up procedure.
Figure 5:
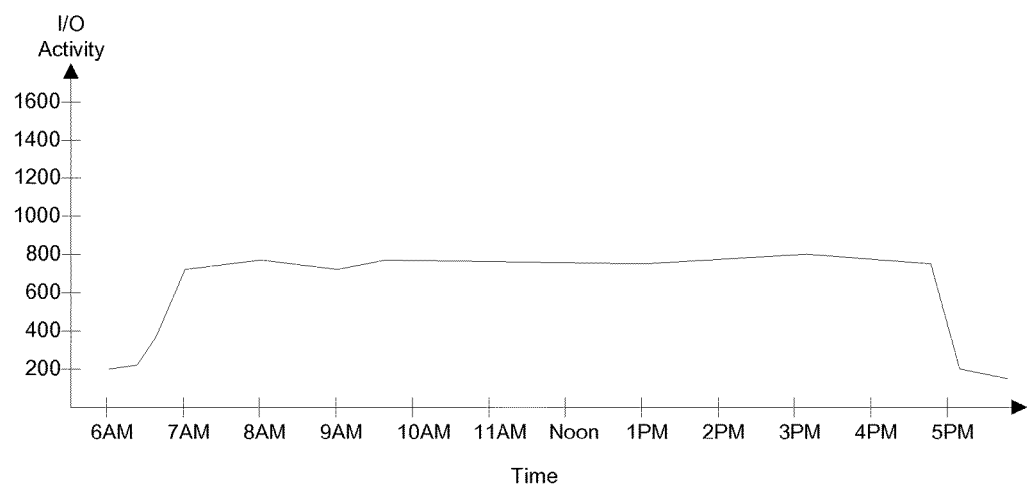
FIG. 5 shows example I/O activity for the data storage equipment after routinely performing the pre-warm-up procedure.

FIGS. 4 and 5 graphically show example I/O activity for a particular LUN 120 of the data storage equipment 22. FIG. 4 shows example the average I/O activity for that particular LUN 120 for consecutive days prior to performing the pre-warm-up procedure. FIG. 5 shows example I/O activity for that particular LUN 120 for a day after performing the pre-warm-up procedure.

First, suppose that the data storage equipment 22 maintains multiple LUNs 120 for an enterprise. In particular, suppose that the data storage equipment 22 maintains a LUN 120(A) which stores the operating system, I/O activity log, utilities, configuration parameters, etc. Further suppose that the data storage equipment 22 maintains a LUN 120(B) which stores a finance department database, a LUN 120(C) which stores a sales department database, and a LUN 120(D) which stores an engineering department database (also see FIG. 3). Other configurations are suitable for use as well.

In this example, the specialized forecasting circuitry, which is formed by the processing circuitry 74 executing the forecasting code 84 (also see FIG. 2), continuously collects I/O activity measurements for each LUN 120 while the data storage equipment 22 performs I/O operations on behalf of the host computers 24 (FIG. 1), and stores these measurements in the I/O activity log. As the specialized forecasting circuitry collects this I/O activity for each, the specialized forecasting circuitry analyzes the I/O activity for trends of high I/O activity. Such trends for detection by the forecasting circuitry can be defined by parameters, rules, policies, etc. One example trend is a 50% spike in I/O activity within an hour, and for that occurrence to exist for at least two business days in a row. Another example trend is a 30% spike I/O activity within a half hour, and for that occurrence to exist for at least three days in a row. Other trends are suitable for use as well.

Furthermore, criteria other than or in addition to a percentage spike and the number of consecutive days can be used to define trends as well. For example, another criteria is for the spikes in I/O activity between consecutive days to have a particular similarity or be relatively close to each other such as within a 20% margin, a 25% margin, and so on. As another example, the I/O activity may need to exceed a certain absolute number of IOPS to be considered high enough for pre-warm-up, e.g., at least 800 IOPS, at least 1000 IOPS, etc.

In the current example, suppose that the specialized forecasting circuitry discovers that the finance department LUN 120(B) as shown by the graph in FIG. 4 is particularly busy at 9 am each business day while other LUNs accessed by other departments such as sales and engineering are not particularly busy at 9 am each business day. In particular, suppose that the specialized forecasting circuitry analyzes the collected I/O activity measurements and detects the finance department LUN 120(B) to be a candidate for pre-warm-up because it fulfills, by way of example, a predefined set of criteria of having at least a 30% spike in I/O activity within a margin of +1-20% between 9 am and 10 am for at least two business days in a row (see 150 in FIG. 4).

Upon such detection, the specialized forecasting circuitry allocates an area 130 in the extension cache memory 112 to store pre-warm-up data (also see FIG. 3). Such operation may take place automatically or prompt a user (e.g., an administrator) for permission first. Moreover, selection of which data is suitable for pre-warm-up can be based on the amount of memory in the allocated extension cache area 130. For example, if the extension cache area 130 is small such as less than 250 GB, the specialized forecasting circuitry may identify certain metadata for pre-warm-up such as LBA mappings, mode structures, database indexes, etc. However, if the extension cache area 130 is large such as greater than 1 TB, the specialized forecasting circuitry may identify actual host data for pre-warm-up, a combination of metadata and host data, and so on. Accordingly, the specialized forecasting circuitry provides a data identification result identifying particular data of the finance department LUN 120(B) for pre-warm-up.

After the particular data is identified and the section 130 of the extension cache memory 112 is allocated, the specialized forecasting circuitry identifies a time ahead of the high I/O activity time to perform the pre-warm-up process. In the example, the high I/O activity occurs between 9 am and 10 am so the specialized forecasting circuitry finds a routine time of low I/O activity which is before 9 am. Here, the specialized forecasting circuitry identifies 6:30 am as a suitable time for the pre-warm-up process (see 152 in FIG. 4). It should be understood that identification of the low activity time can be based on a set of criteria as well such as there being no more than 400 IOPS and the pre-warm-up time being no earlier than three hours ahead of the high I/O activity. Other criteria is suitable for use as well such as placing the pre-warm-up time far enough ahead of the high I/O activity time so that pre-fetching the data will complete before the high I/O activity time, and so on.

Next, at 6:30 am on the next business day and in response to the data identification result identifying the particular data of the finance department LUN 120(B) for pre-warm-up, the specialized forecasting circuitry directs specialized data moving circuitry to perform the pre-warm-up process. Recall that the specialized data moving circuitry is formed by the processing circuitry 74 executing the data moving code 86 (also see FIG. 2). In some arrangements, the data moving code 86 forms part of the I/O stack, i.e., is an embedded part of the operating system 82 which is involved in managing synchronization of data between the primary storage 100 and the secondary storage 102.

Accordingly, starting at 6:30 am the next business day, the specialized data moving circuitry copies (i.e., pre-fetches) the identified data from the secondary storage 102 into the section 130 of the extension cache 112 of the primary storage 100 (FIG. 3). With the data now available in the primary storage 100, the processing circuitry 74 accesses the pre-fetched data from the section 130 of the extension cache 112 while performing host I/O operations on behalf of the host computers 24. In particular, response time is now reduced and the load on the particular LUN 120 is more even. This is reflected in FIG. 5 which shows that the I/O activity after pre-warm-up is more consistent or balanced throughout the day compared to that of FIG. 4.

The data storage equipment 22 then continues to monitor I/O activity and make adjustments as necessary over time. For example, if there is no change in I/O activity other than as illustrated in FIG. 5, the data storage equipment 22 continues to pre-fetch the data from secondary storage to the extension cache at the same time on every business day in the future so that such days enjoy reduced response time and even I/O activity.

It should be understood that the data storage equipment 22 can perform the pre-warm-up process for multiple LUNs 120. For example, the data storage equipment 22 may, at custom times of the day, pre-fetch certain data of the sales department LUN 120(C) and/or the engineering department LUN 120(D) from the secondary storage 102 into the extension cache 112 of the primary storage 100 depending on when those LUNs 120 have routine periods of high I/O activity and low I/O activity. Further detail will now be provided with reference to FIG. 6.

Figure 6:
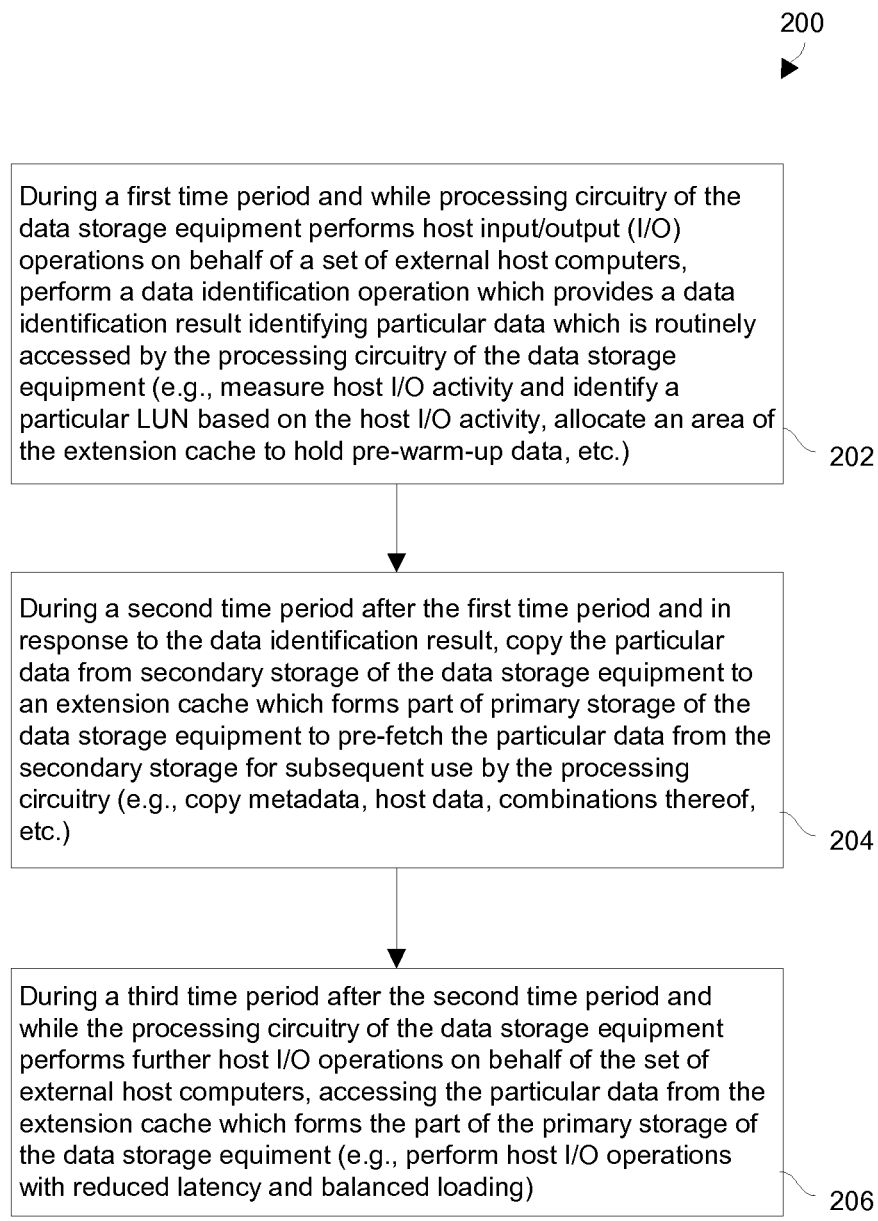
FIG. 6 is a flowchart of a procedure which is performed by the data storage equipment of FIG. 2.

FIG. 6 is a flowchart of a procedure 200 which is performed by the data storage equipment 22. At 202, during a first time period and while processing circuitry 74 of the data storage equipment 22 performs host I/O operations on behalf of a set of external host computers 24, the data storage equipment 22 performs a data identification operation which provides a data identification result identifying particular data which is routinely accessed by the processing circuitry of the data storage equipment 22. In particular, the data storage equipment 22 measures host I/O operation statistics while the processing circuitry 74 performs the host I/O operations, and identifies the particular data (e.g., LUN 120(B) in FIG. 3) based on the host I/O operation statistics. To this end, the data storage equipment 22 applies a set of predefined criteria to identify a trend in high I/O activity (e.g., see 152 for the LUN 120(B) in FIG. 4).

At 204, during a second time period after the first time period and in response to the data identification result, the data storage equipment 22 copies at least a portion of the particular data from secondary storage of the data storage equipment 22 to an extension cache which forms part of primary storage of the data storage equipment 22 to pre-fetch the particular data from the secondary storage for subsequent use by the processing circuitry 74. Here, the data storage equipment 22 may copy metadata (e.g., LBA mappings, mode structures, database indexes, etc.) and/or host data depending on the amount of space available in the extension cache. Such pre-fetching of the data into the extension cache alleviates the need to later move the data from the secondary storage into primary memory in response to a host I/O instruction.

At 206, during a third time period after the second time period and while the processing circuitry of the data storage equipment 22 performs further host I/O operations on behalf of the set of external host computers 24, the data storage equipment 22 accesses the particular data from the extension cache which forms part of the primary storage of the data storage equipment 22. Here, the processing circuitry 74 of the data storage equipment 22 simply accesses the pre-fetched data from the extension cache without further loading that data from the secondary memory. Accordingly, response time is improved and I/O activity is more balanced.

As described above, improved techniques are directed to performing a pre-warm-up procedure by intelligently forecasting when a set of host computers 24 will access certain host data at a routine time in the future and then, in response to the forecast, moving certain data from secondary storage 102 (e.g., an array of storage devices) into an extension cache 112 (e.g., flash memory which expands primary storage 100) ahead of time. The data which is moved into the extension cache 112 may be the host data itself, metadata (e.g., a table of logical block addresses, a portion of an mode table, other indexes, etc.), combinations thereof, and so on. Such operation reduces response time (e.g., data is already moved to primary storage and available) as well as stabilizes input/output (I/O) operations per second (IOPS) over the course of operation (e.g., the data is moved into primary storage during periods of lower IOPS).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. For example, the host computers 24 may be servers which access host data on the data storage equipment 22 and provide services to a set of client devices. Here, the various computer resources of the host computers 24 may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that the disclosed improvements are more than simply pre-fetching data (e.g., due to serial execution of software). Rather, such improvements involve intelligently forecasting when a host computer will access certain data (i.e., predicting high host I/O activity), and copying data from secondary storage into primary storage ahead of that time to reduce response time and to balance loading.

Furthermore, it should be understood that the extension cache memory 112 was described above as including flash memory cards 116 by way of example only. The extension cache memory 112 may be formed in other ways as well such as by a set of solid state drives, etc. Such modifications and enhancements are intended to belong to various embodiments of the disclosure.

What is claimed is:
1. A method of operating data storage equipment, the method comprising:
   during a first time period and while processing circuitry of the data storage equipment performs host input/output (I/O) operations on behalf of a set of external host computers, performing a data identification operation which provides a data identification result identifying particular data which is routinely accessed by the processing circuitry of the data storage equipment;
   during a second time period after the first time period and in response to the data identification result, copying the particular data from secondary storage of the data storage equipment to an extension cache which forms part of primary storage of the data storage equipment to pre-fetch the particular data from the secondary storage for subsequent use by the processing circuitry; and
   during a third time period after the second time period and while the processing circuitry of the data storage equipment performs further host I/O operations on behalf of the set of external host computers, accessing the particular data from the extension cache which forms part of the primary storage of the data storage equipment,
   wherein the primary storage includes random-access memory (RAM);
   wherein the extension cache resides in the RAM;
   wherein performing the data identification operation includes:
      measuring host I/O operation statistics while the processing circuitry performs the host I/O operations on behalf of the set of external host computers, and identifying the particular data based on the host I/O operation statistics which were measured while the processing circuitry performed the host I/O operations on behalf of the set of external host computers;

wherein the secondary storage of the data storage equipment includes an array of storage devices which stores multiple logical units of storage (LUNs);

wherein measuring the host I/O operation statistics includes collecting respective host I/O activity metrics for the multiple LUNs over a series of days of the first time period;

wherein identifying the particular data based on the host I/O operation statistics includes selecting a particular LUN of the multiple LUNs based on the respective host I/O activity metrics which were collected over the series of days;

wherein selecting the particular LUN of the multiple LUNs based on the respective host I/O activity metrics which were collected over the series of days of the first time period includes:

based on the respective host I/O activity metrics, (i) detecting a high host I/O activity trend for the particular LUN which lasts a predefined number of days of the series of days, the predefined number of days being at least two days, and (ii) outputting a particular LUN identifier which uniquely identifies the particular LUN among the multiple LUNs;

wherein detecting the high host I/O activity trend for the particular LUN which lasts the predefined number of days of the series of days includes:

discovering that host I/O activity for the particular LUN exceeded a predefined high host I/O activity threshold during a particular time of day on each day of the predefined number of days of the series of days;

wherein copying the particular data from the secondary storage to the extension cache includes:

based on the particular LUN identifier, transferring at least a portion of the particular LUN to the extension cache during the second time period; and wherein transferring at least the portion of the particular LUN to the extension cache during the second time period includes:

moving metadata of the particular LUN from the array of storage devices to the extension cache, the metadata being different from host data which is read and written by the set of external host computers.

2. A method as in claim 1, further comprising:

identifying a certain time of the day on each day of the predefined number of days of the series of days in which the host I/O activity for the particular LUN was less than a predefined low host I/O activity threshold, and setting the certain time of a particular day following the series of days as the second time period during which at least the portion of the particular LUN is transferred to the extension cache.

3. A method as in claim 2 wherein accessing the particular data from the extension cache during the third time period includes:

accessing the portion of the particular LUN during the particular time of day of the particular day following the series of days.

4. A method as in claim 1 wherein the data storage equipment stores the host data in a block-based volume; and wherein moving the metadata includes:

copying at least a portion of a logical block address (LBA) table for the particular LUN from the array of storage devices to the extension cache.

5. A method as in claim 1 wherein the data storage equipment stores the host data as files of a file system; and wherein moving the metadata includes:

copying at least a portion of an mode table of the file system from the array of storage devices to the extension cache.

6. A method as in claim 1 wherein the primary storage of the data storage equipment includes (i) volatile memory which provides a standard access time which is faster than that provided by the array of storage devices and (ii) non-volatile flash memory which, operating as at least a portion of the RAM, forms the extension cache; and wherein the method further comprises:

allocating a portion of the non-volatile flash memory which forms the extension cache as a pre-fetch cache to hold pre-fetched data.

7. A method as in claim 6 wherein allocating the portion of the non-volatile flash memory which forms the extension cache as the pre-fetch cache to hold pre-fetched data includes:

defining, as the pre-fetch cache, an area of non-volatile memory formed by a set of solid state storage units, the particular data being copied from the secondary storage of the data storage equipment to the area of non-volatile memory formed by the set of solid state storage units during the second time period.

8. A method as in claim 6 wherein allocating the portion of the non-volatile flash memory which forms the extension cache as the pre-fetch cache to hold pre-fetched data includes:

defining, as the pre-fetch cache, an area of non-volatile memory formed by a set of flash memory cards, the particular data being copied from the secondary storage of the data storage equipment to the area of non-volatile memory formed by the set of flash memory cards during the second time period.

9. A method as in claim 1 wherein performing the data identification operation further includes:

identifying a particular time of day that the particular data is routinely requested based on prior input/output activity for the particular data, the prior input/output activity being retrieved from an activity log; and wherein transferring at least the portion of the particular LUN to the extension cache during the second time period is performed prior to reaching the particular time.

10. A method as in claim 1 wherein performing the data identification operation further includes:

identifying a particular day of the week and time of that day that the particular data is routinely requested based on prior input/output activity for the particular data, the prior input/output activity being retrieved from an activity log; and wherein transferring at least the portion of the particular LUN to the extension cache during the second time period is performed at a time prior to reaching the particular time.

11. Data storage equipment, comprising:

a communications interface to communicate with a set of external host computers;

memory which forms primary storage and secondary storage; and processing circuitry coupled to the communications interface and the memory, the memory storing instructions which, when carried out by the processing circuitry, cause the processing circuitry to:
during a first time period and while the processing circuitry performs host input/output (I/O) operations on behalf of the set of external host computers, perform a data identification operation which provides a data identification result identifying particular data which is routinely accessed by the processing circuitry,
during a second time period after the first time period and in response to the data identification result, copy the particular data from the secondary storage to an extension cache which forms part of the primary storage to pre-fetch the particular data from the secondary storage for subsequent use by the processing circuitry, and
during a third time period after the second time period and while the processing circuitry performs further host I/O operations on behalf of the set of external host computers, access the particular data from the extension cache which forms part of the primary storage;
wherein the primary storage includes random-access memory (RAM);
wherein the extension cache resides in the RAM;
wherein the processing circuitry, when performing the data identification operation, is constructed and arranged to:
measure host I/O operation statistics while performing the host I/O operations on behalf of the set of external host computers, and
identify the particular data based on the host I/O operation statistics which were measured while the processing circuitry performed the host I/O operations on behalf of the set of external host computers;
wherein the secondary storage of the data storage equipment includes an array of storage devices which stores multiple logical units of storage (LUNs);
wherein the processing circuitry, when measuring the host I/O operation statistics, is constructed and arranged to collect respective host I/O activity metrics for the multiple LUNs over a series of days of the first time period;
wherein the processing circuitry, when identifying the particular data based on the host I/O operation statistics, is constructed and arranged to select a particular LUN of the multiple LUNs based on the respective host I/O activity metrics which were collected over the series of days;
wherein the processing circuitry, when selecting the particular LUN of the multiple LUNs based on the respective host I/O activity metrics which were collected over the series of days of the first time period, is constructed and arranged to:
based on the respective host I/O activity metrics, (i) detect a high host I/O activity trend for the particular LUN which lasts a predefined number of days of the series of days, the predefined number of days being at least two days, and (ii) output a particular LUN identifier which uniquely identifies the particular LUN among the multiple LUNs;
wherein the processing circuitry, when detecting the high host I/O activity trend for the particular LUN which lasts the predefined number of days of the series of days, is constructed and arranged to:
discover that host I/O activity for the particular LUN exceeded a predefined high host I/O activity threshold during a particular time of day on each day of the predefined number of days of the series of days;
wherein the processing circuitry, when copying the particular data from the secondary storage to the extension cache, is constructed and arranged to:
based on the particular LUN identifier, transfer at least a portion of the particular LUN to the extension cache during the second time period; and
wherein the processing circuitry, when transferring at least the portion of the particular LUN to the extension cache during the second time period, is constructed and arranged to:
move metadata of the particular LUN from the array of storage devices to the extension cache, the metadata being different from host data which is read and written by the set of external host computers.

12. Data storage equipment as in claim 11 wherein the primary storage includes (i) volatile memory which provides a standard access time which is faster than that provided by the array of storage devices and (ii) non-volatile flash memory which forms the extension cache; and wherein the processing circuitry is further constructed and arranged to:
allocate a portion of the non-volatile flash memory which forms the extension cache as a pre-fetch cache to hold pre-fetched data.

13. Data storage equipment as in claim 12 wherein the processing circuitry, when allocating the portion of the non-volatile flash memory which forms the extension cache as the pre-fetch cache to hold pre-fetched data, is constructed and arranged to:
define, as the pre-fetch cache, an area of non-volatile memory formed by a set of solid state storage units, the particular data being copied from the secondary storage to the area of non-volatile memory formed by the set of solid state storage units during the second time period.

14. Data storage equipment as in claim 12 wherein the processing circuitry, when allocating the portion of the non-volatile flash memory which forms the extension cache as the pre-fetch cache to hold pre-fetched data, is constructed and arranged to:
defining, as the pre-fetch cache, an area of non-volatile memory formed by a set of flash memory cards, the particular data being copied from the secondary storage to the area of non-volatile memory formed by the set of flash memory cards during the second time period.

15. A computer program product having a non-transitory computer readable medium which stores a set of instructions to pre-fetch data, the set of instructions, when carried out by data storage equipment, causing the data storage equipment to perform a method of:
during a first time period and while processing circuitry of the data storage equipment performs host input/output (I/O) operations on behalf of a set of external host computers, performing a data identification operation which provides a data identification result identifying particular data which is routinely accessed by the processing circuitry of the data storage equipment;
during a second time period after the first time period and in response to the data identification result, copying the particular data from secondary storage of the data storage equipment to an extension cache which forms part of primary storage of the data storage equipment to pre-fetch the particular data from the secondary storage for subsequent use by the processing circuitry; and
during a third time period after the second time period and while the processing circuitry of the data storage equipment performs further host I/O operations on behalf of the set of external host computers, accessing the particular data from the extension cache which forms part of the primary storage of the data storage equipment;
wherein the primary storage includes random-access memory (RAM);
wherein the extension cache resides in the RAM;
wherein performing the data identification operation includes:
  measuring host I/O operation statistics while the processing circuitry performs the host I/O operations on behalf of the set of external host computers, and
  identifying the particular data based on the host I/O operation statistics which were measured while the processing circuitry performed the host I/O operations on behalf of the set of external host computers;
wherein the secondary storage of the data storage equipment includes an array of storage devices which stores multiple logical units of storage (LUNs);
wherein measuring the host I/O operation statistics includes collecting respective host I/O activity metrics for the multiple LUNs over a series of days of the first time period;
wherein identifying the particular data based on the host I/O operation statistics includes selecting a particular LUN of the multiple LUNs based on the respective host I/O activity metrics which were collected over the series of days;
wherein selecting the particular LUN of the multiple LUNs based on the respective host I/O activity metrics which were collected over the series of days of the first time period includes:
  based on the respective host I/O activity metrics, (i) detecting a high host I/O activity trend for the particular LUN which lasts a predefined number of days of the series of days, the predefined number of days being at least two days, and (ii) outputting a particular LUN identifier which uniquely identifies the particular LUN among the multiple LUNs;
wherein detecting the high host I/O activity trend for the particular LUN which lasts the predefined number of days of the series of days includes:
  discovering that host I/O activity for the particular LUN exceeded a predefined high host I/O activity threshold during a particular time of day on each day of the predefined number of days of the series of days;
wherein copying the particular data from the secondary storage to the extension cache includes:
  based on the particular LUN identifier, transferring at least a portion of the particular LUN to the extension cache during the second time period; and
wherein transferring at least the portion of the particular LUN to the extension cache during the second time period includes:
  moving metadata of the particular LUN from the array of storage devices to the extension cache, the metadata being different from host data which is read and written by the set of external host computers.

16. A method as in claim 9, further comprising:
prior to the second time period, identifying an anticipated time of low input/output traffic based on the prior input/output activity retrieved from the activity log;
wherein the time prior to reaching the particular time is during the anticipated time of low input/output traffic.

* * * * *